United States Patent [19]

Lancesseur

[11] Patent Number: 5,432,214

[45] Date of Patent: Jul. 11, 1995

[54] POLYMER-BASED DEHYDRATING MATERIALS

[75] Inventor: Didier Lancesseur, Choisy-Le-Roi, France

[73] Assignee: Airsec Industries, Societe Anonyme, Choisy-Le-Roi, France

[21] Appl. No.: 154,429

[22] Filed: Nov. 19, 1993

[30] Foreign Application Priority Data

Nov. 20, 1992 [FR] France .................................. 92 13947

[51] Int. Cl.$^6$ ................................................ C08K 7/02
[52] U.S. Cl. ....................................... 524/12; 523/222; 524/9; 524/10; 524/27; 524/34; 524/15; 524/450; 524/492; 524/493; 524/502; 524/513
[58] Field of Search ............... 524/9, 27, 34, 10, 12, 524/15, 450, 492, 493, 502, 513; 523/222

[56] References Cited

U.S. PATENT DOCUMENTS

| | | | |
|---|---|---|---|
| 2,781,326 | 2/1957 | Lewis, Jr. ..................... | 524/34 X |
| 4,061,807 | 12/1977 | Shaler . | |
| 4,203,876 | 5/1980 | Dereppe et al. ................. | 524/9 |

FOREIGN PATENT DOCUMENTS

| | | |
|---|---|---|
| 0400460 | 12/1990 | European Pat. Off. . |
| 0432438 | 6/1991 | European Pat. Off. . |
| 2379691 | 9/1978 | France . |
| 2614236 | 10/1977 | Germany . |
| 2721511 | 11/1977 | Germany . |

*Primary Examiner*—Judy M. Reddick
*Attorney, Agent, or Firm*—Oblon, Spivak, McClelland, Maier & Neustadt

[57] ABSTRACT

A dehydrating plastics material composition of high moisture-absorption capacity, comprising:
- A) 50% to 80% by weight of one or more compatible thermoplastic or thermosetting polymers;
- B) 20% to 50% by weight of one or more dehydration agents;
- C) 2% to 8% by weight of one or more elastomers; and
- D) 1% to 4% by weight of fibers of lengths lying in the range 0.5 mm to 4 mm, the fibers being selected from: synthetic fibers, vegetables fibers, and animal fibers.

A method of preparing such a composition.

A package or container whose inside surface is constituted by a plastics material of the above composition.

9 Claims, No Drawings

POLYMER-BASED DEHYDRATING MATERIALS

FIELD OF THE INVENTION

The present invention relates to the field of filled plastics materials of high moisture-absorbing capacity, suitable at ambient temperatures for constituting substantially continuous solid structures of various shapes such as hollow cylinders or plates, and capable of being transformed, in particular by injection, thermoforming, or blow molding.

Substances having these characteristics may be looked for in numerous applications: packaging goods that are sensitive to moisture, in particular foods or pharmaceuticals, semiconductor technology, and in general any application that makes use of confined spaces in which a low humidity level is required over a period of time that is short to medium.

BACKGROUND OF THE INVENTION

To this end, it is known that composite structures can be implemented comprising, in succession from the inside towards the outside:

1) a porous layer that allows moisture to pass;
2) a layer that absorbs moisture; and
3) a moisture-proof layer.

OBJECT AND SUMMARY OF THE INVENTION

Nevertheless, implementing such multilayer composites requires methods and apparatuses to be implemented that are complex, and which can be simplified by means of the present invention by using plastics materials that are suitable for use in a single layer to replace above-specified layers 1) and 2).

To this end, the present invention provides a dehydrating plastics material composition of high moisture-absorption capacity, containing:

- 50% to 80% by weight of one or more compatible thermoplastic or thermosetting polymers;
- 20% to 50% by weight of one or more dehydration agents;
- 2% to 8% by weight of one or more elastomers; and
- 1% to 4% by weight of fibers of lengths lying in the range 0.5 mm to 4 mm, the fibers being selected from: synthetic fibers, vegetables fibers, and animal fibers.

At equivalent effectiveness, a composition of the invention makes it possible to avoid the difficulties of assembling together the above-mentioned porous layer and moisture-absorbing layer.

Although any thermoplastic or thermosetting polymers can be used in the context of the invention, the following are particularly preferred: polystyrenes; polyolefins (polyethylene, polypropylene); polyamides; and polyvinyl chloride; on their own or in association; or unsaturated polyesters; phenol resins; Bakelites; and polyurethanes; on their own or in association.

Preferred dehydration agents are silica gels and molecular sieves.

In contrast, no particular elastomer is preferred. Thus, it is possible to use: styrene-butadiene rubbers (SBR); styrene-ethylene-butadiene-styrene copolymers (SEBS); butyl rubbers; ethylene-propylene rubbers (EPR); ethylene-propylene-diene monomer rubbers (EPDM); ethylene-vinyl acetate copolymers (EVA); ethyleneacrylate or butadiene-acrylonitrile; polynorbornenes; or indeed polyisoprenes; poolychllroprenes; or polybutadienes.

Suitable fibers include synthetic fibers such as acrylic, polyester, of polyamide fibers, natural fibers which may be animal fibers such as wool or silk, or vegetable fibers such as cotton or flax.

Where applicable, compositions of the invention further include appropriate quantities of any organic or inorganic additives that are usual in the field of plastics, in particular plasticizing agents, stabilizers, dyes, and pigments.

The present invention also provides a method of preparing a dehydrating plastics material having high moisture-absorbing capacity, in which at least the following are homogeneously mixed:

- 50% to 80% by weight of one or more compatible thermoplastic or thermosetting polymers;
- 20% to 50% by weight of one or more dehydration agents;
- 2% to 8% by weight of one or more elastomers; and
- 1% to 4% by weight of fibers of lengths lying in the range 0.5 mm to 4 mm, the fibers being selected from: synthetic fibers, vegetables fibers, and animal fibers.

When the polymer component of the mixture is constituted by one or more thermoplastic polymers, the transformation is advantageously performed by extrusion, preferably using an extruder having two co-rotating screws.

The invention also provides a package or a container whose inside surfaces are constituted by a plastics material having a composition of the invention.

The following example illustrates the invention.

EXAMPLE

The six compositions specified in Table 1 below were prepared by mixing, where quantities are expressed in percentages by weight.

TABLE 1

| Composition | 1 | 2 | 3 | 4 | 5 | 6 |
|---|---|---|---|---|---|---|
| PS | 65 | 65 | 65 | 65 | 60 | 60 |
| SEBS | 4 | 4 | 4 | 4 | 4 | 4 |
| Gel powder | 30 | | | 15 | 15 | 30 |
| Sieve powder | | 30 | | 15 | 15 | |
| Molecular sieve | | | 30 | | | |
| Lithopone | | | | | 5 | 5 |
| Cotton fibers | 1 | 1 | 1 | 1 | 1 | 1 |

PS = polystyrene
SEBS = blocks of linear styrene-(ethylene-butylene)-styrene copolymer A 3 mm thick plate was made using composition No. 6 of Table 1 and then left for duration d in an atmosphere having 80% residual humidity, and moisture takeup was measured as a function of duration (moisture absorption in percentage weight of the plate). The results are given in Table 2 below.

TABLE 2

| d | moisture takeup (%) |
|---|---|
| 24 hours | 1.65 |
| 48 hours | 2.45 |
| 5 days | 3.75 |
| 7 days | 4.30 |
| 9 days | 4.75 |

Compositions of the invention are remarkable for their high moisture-absorption capacities, and also, more surprisingly, for their high odor-absorption capacities.

What is claimed is:

1. A dehydrating plastic material composition of high moisture-absorption capacity, comprising:
   A) 50–80% by weight of one or more thermoplastic or thermosetting polymers;
   B) 20–50% by weight of one or more dehydration agents;
   C) 2–8% by weight of one or more elastomers; and
   D) 1–4% by weight of fibers of lengths in the range 0.5–4 mm, wherein said fibers are selected from the group consisting of synthetic fibers, vegetable fibers and animal fibers.

2. The composition of claim 1, wherein said component A) is a thermoplastic polymer selected from the group consisting of a polystyrene, a polyolefin, a polyamide and polyvinyl chloride.

3. The composition of claim 1, wherein said component A) is a thermosetting polymer selected from the group consisting of an unsaturated polyester, a phenol resin, and a polyurethane.

4. The composition of claim 1, wherein said dehydration agent is selected from the group consisting of a silica gel and a molecular sieve.

5. The composition of claim 1, wherein said fibers are selected from the group consisting of acrylic fibers, polyester fibers, wool fibers, silk fibers, cotton fibers and flax fibers.

6. The composition of claim 2, wherein said thermoplastic polymer is a polystyrene.

7. The composition of claim 6, wherein said dehydration agent is a silica gel.

8. The composition of claim 7, wherein said fibers are cotton fibers.

9. The composition of claim 1, wherein said elastomer is selected from the group consisting of a styrene-butadiene rubber, a styrene-ethylene-butadiene-styrene copolymer, a butyl rubber, an ethylene-propylene rubber, an ethylene-propylene-diene monomer rubber, an ethylene-vinyl acetate copolymer, an ethylene-acrylate copolymer, a butadiene-acrylonitrile copolymer, an polynorbornene, a polyisoprene, a polychloroprene and a polybutadiene.

* * * * *